United States Patent [19]

Taddeo et al.

[11] Patent Number: 4,843,534
[45] Date of Patent: Jun. 27, 1989

[54] DC TO AC SWITCHING CONVERTER WITH PHASED DELAYED PARALLEL SWITCHERS

[75] Inventors: Fausto V. Taddeo; Mark A. Woodward, both of Huntington Beach, Calif.

[73] Assignee: Pacific Power Source Corp., Huntington Beach, Calif.

[21] Appl. No.: 120,122

[22] Filed: Nov. 13, 1987

[51] Int. Cl.$^4$ .................... H02M 7/519; H02M 7/527
[52] U.S. Cl. ........................................ 363/71; 363/134
[58] Field of Search ...................... 363/26, 41, 71, 134

[56] References Cited

U.S. PATENT DOCUMENTS

| | | | |
|---|---|---|---|
| 4,067,057 | 1/1978 | Taddeo et al. | 363/41 |
| 4,174,534 | 11/1979 | Kotlarewsky | 363/26 |
| 4,359,679 | 11/1982 | Regan | 363/26 |
| 4,425,613 | 1/1984 | Shelly | 363/71 |
| 4,695,933 | 9/1987 | Nguyen et al. | 363/71 |

Primary Examiner—Patrick R. Salce
Assistant Examiner—Jeffrey L. Sterrett
Attorney, Agent, or Firm—Allan M. Shapiro

[57] ABSTRACT

In a switching type DC to AC power converter a plurality (A–D, FIG. 6) of pairs of switchers (S1 and S2) are connected through inductors ($L_A$–$L_D$) to a load. Each set of switchers is switched to produce a square wave shaped output voltage (FIGS. 5A–5D) at a switch frequency ($f_S$) and at a modulation percentage to produce an output voltage ($E_O$) to a load, at a selected frequency. The sets are switched at phased delays, so that the ripple currents through them, when summed up, result in a ripple current $I_T$ at a frequency $f_C$, where $f_C = n \cdot f_S$, n being the number of pairs of switchers. In another aspect of the invention, means are incorporated to prevent the flow of currents between parallel connected amplifiers, characterized by zero output impedances.

11 Claims, 3 Drawing Sheets 4,843,534

DC TO AC SWITCHING CONVERTER WITH PHASED DELAYED PARALLEL SWITCHERS

BACKGROUND OF THE INVENTION

1. Field of the Invention

The present invention generally relates to power conversion and, more particularly, to a DC to AC power converter of the switching type with high efficiency and fast response time, i.e., broad band width.

2. Description of the Prior Art

If one were to enumerate the desired properties of the "ideal" or "perfect" DC to AC power converter, the list undoubtedly would be headed by high efficiency and fast response time, i.e., broad band width. Other properties that would be included are high power capacity, minimum maintenance, use of relatively simple, easily available components, compactness, and last but not least, inexpensiveness. None of the known converters have all or even most of the above-recited properties.

Converters of the linear type have very fast response time (broad band width) so that output signal fidelity is maintained for varying load conditions. However, linear type converters are quite inefficient. A considerable amount of power is wasted in the form of heat, which needs to be removed. Consequently, linear converters are relatively large and are limited to modest power levels, e.g., up to 50 KW.

Converters of the switching type, to which the present invention is related, also known and hereafter referred to as switching converters, are very efficient. However, their response time is usually much lower than desired. As is known by those familiar with the art, a switching converter includes a low pass filter at its output in order to filter out the high switching frequency current component, generally known as the ripple current. The filter, which typically consists of multiple L-C sections, is designed to inhibit most, if not all, of the switching energy from passing to the output load. As is known, the higher the reduction of the switching energy to the load, the slower is the response time to load requirements.

Theoretically, this problem may be alleviated by increasing the switching frequently significantly. However, with the present state of the art, an upper limit of such switching frequency is dictated. At present, the switching rate of reliable switching devices is typically on the order of less than 100 kHz. An upper switching frequency limit of 50–60 kHz is typically the present state of the art upper switching frequency limit. This is due to the fact that the types of solid state switching devices which are presently available and used in switching converters have relatively moderate rise time and even longer fall times, on the order of 200 nsec and more. Since in a switching converter one of these switchers has to be turned On only after the other is totally Off, due to the relatively long rise and fall times, for reliable operation, these switchers cannot be switched at anywhere near the optimal desired switching rates; i.e, several hundred kHz. Thus, their switching rate is, as herebefore stated, limited to about 60 kHz or less. Even if switchers with much shorter rise and fall times were available for possible use in switching converters, one has to consider the drop in efficiency that may occur due to the significantly higher switch rates. As is known, the loss of power in a switcher is directly proportional to its switching rate. Consequently, the higher the switching rate, the greater the power loss; i.e., lower efficiency.

It is for the above reasons that present-day switching converters incorporate switchers which are operated at only 50–60 kHz or less. Furthermore, to inhibit switch energy from passing to the load, typically, 80 dB or more of filtering is provided which results in relatively narrow band width, i.e., long response time, on the order of 500 usec or more, whereas one-tenth of such response time is often desired.

SUMMARY OF THE INVENTION

The novel power converter of the present invention is of the switching type. It includes novel circuitry to that from a systems point of view, the effective switching rate is a multiple of the actual switch rate. Included in the converter is a plurality of sets of swtichers which are all connected in parallel to a load and which are switched in a phase delayed mode. The actually used switchers are of the present state of the art with reliable, and efficient switching capability of up to 60 kHz. However, due to the use of the multiple sets of switchers and phase delayed switching, as well as a unique filtering arrangement, the response time of the switching converter is extremely short, e.g., 50 usec or less. Consequently, the converter is adapted to respond to sharp, non-linear loads which require broad band system response.

The novel features of the present invention are set forth with particularity in the appended claims. The invention will best be understood from the following description when read in conjunction with the accompanying drawings.

BRIEF DESCRIPTION OF THE DRAWINGS

FIGS. 4 and 6 are schematic-block diagrams useful in explaining one aspect of the present invention;

FIGS. 5A–5E are waveform diagrams for explaining the arrangements shown in FIGS. 4 and 6;

DESCRIPTION OF THE PREFERRED EMBODIMENTS

Figure 2:
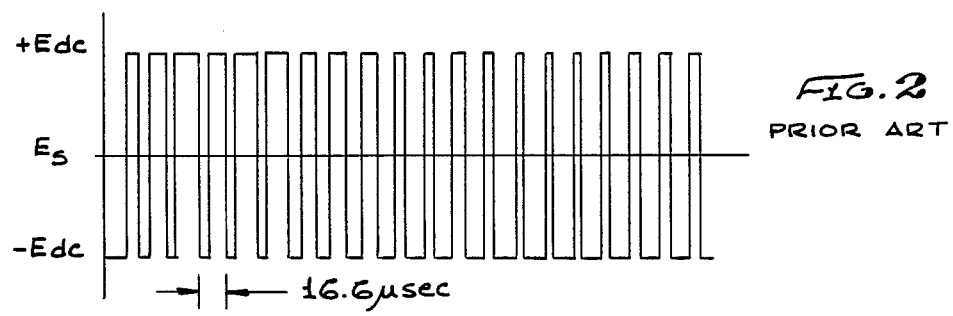
FIGS. 2 and 3 are waveform diagrams useful in explaining the operation of a switching type converter.
Figure 3:
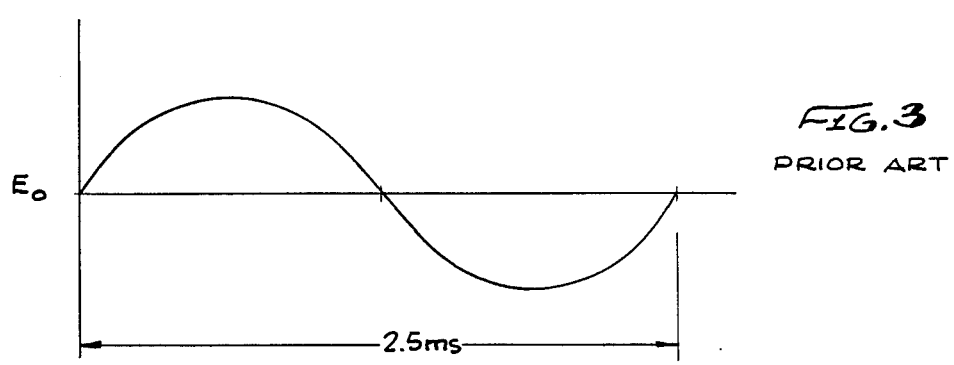
Figure 5A:
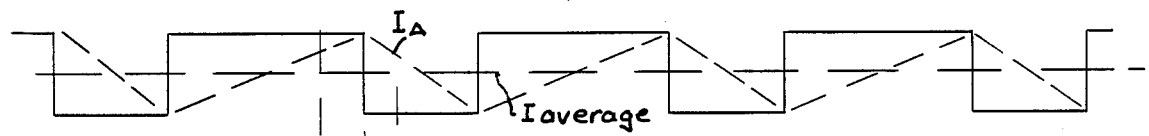
Figure 5B:
Figure 5C:
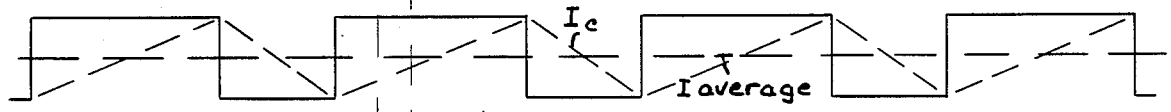
Figure 5D:
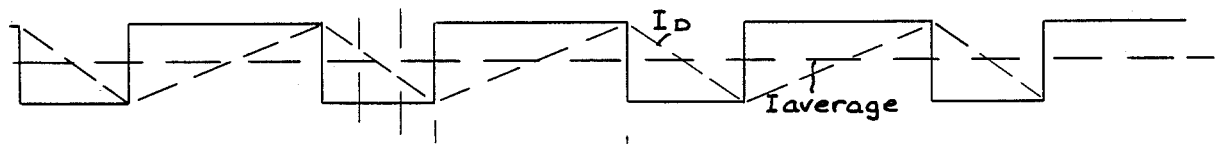
Figure 9:
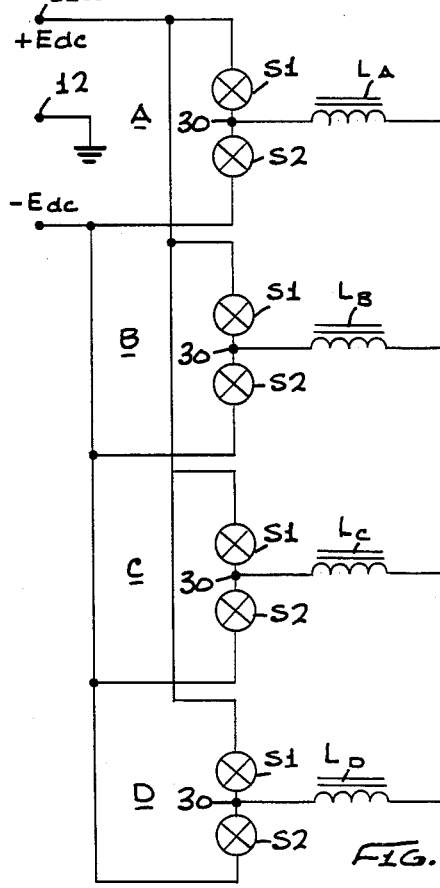

The unique and novel features of the present invention may best be explained and understood by first summarizing the state of the art of switching converters, to which the invention is related. This may best be accomplished in conjunction with FIGS. 1–3 which effectively correspond to FIGS. 3, 2b and 2c in U.S. Pat. No. 4,067,057, issued on Jan. 3, 1978. Basically, in the prior art switching converter, a single set A of two switchers S1 and S2 is employed. It is connected across a DC source +Edc and −Edc. The switch rate or frequency $f_S$ is controlled by a generator such as 60 kHz generator 42. In the Patent, a 10 kHz generator is shown. The percent modulation is a function of an error signal $E_C$, which is in turn a function of the relationship of the waveform from oscillator 35, designated Eosc and the output waveform or voltage Ef across output terminals 13 and 14. The frequency of oscillator 35 assumed herein s 400 Hz (150 Hz in the Patent) is assumed to be the desired AC output frequency. FIG. 2 is the 60 kHz waveform voltage $E_S$ at junction point 30 and FIG. 3 is the desired 400 Hz waveform voltage after filtering by the multiple L-C sections of filter 18. The limited advantages of such a switching converter are well known and were highlighted herebefore. Briefly, from a voltage disturbance point of view, assuming that $+Edc = +200$ V and $-Edc = -200$ V, a swing of 400 V, and that not more than 400 mV ripple voltage is acceptable, the filter would have to provide 60 dB of filtering. At a switch rate of 60 kHz one can obtain such filtering with inductance of 208 uH and a capacitor of 33 uF. The corner of the filter would be at only 600 Hz. Alternatively stated, the band width would be only 600 Hz which is very narrow. Higher switching rate would help. However, as explained, this is not easily obtainable and even if possible it would increase coast and reduce efficiency.

From a ripple current point of view, assuming a 40 A output current and a 20 percent ratio of ripple current to output current, the riple current would fluctuate from about $40 A + 8 A = 48 A$ to $40 A - 8 A = 32 A$, i.e., a peak to peak swing of 16 A. It is acknowledged that this peak to peak will occur at 50 percent modulation and will decrease with increased modulation. However, at best it still will be on the order of 10 A or more. Thus, large capacitors need be incorporated. All of these disadvantages are overcome by the present invention.

FIG. 4 to which reference is now made is a simplified partial diagram of the novel switching converter of the present invention. The novel converter includes a plurality of sets of pairs of switches S1 and S1. In FIG. 4, four sets designated A, B, C and D are included. The pair of switchers of each set are connected across $+Edc$ and $-Edc$, as herebefore described. The junction point 30 of each pair is connected through a separate inductor L to the common output terminal 13 to which the load is typically connected. In FIG. 4 the four inductors associated with sets A-D are designated by $L_A$, $L_B$, $L_C$ and $L_D$. Not shown in FIG. 4 are the switch control signals Ec1 and Ec2. At this pint it is sufficient to state that in the present invention each set of switchers is switched at a selected phase delay with respect to the others. Preferably, though not limited thereto, for n sets of switchers, where n is an integer, (n=4 in FIG. 4) the number of degrees of phase delay is defined as p, where $p = m \times 360/n$, where $m = 0, 1 \ldots (n-1)$ and is a term associated with each set. Thus, in the FIG. 4 embodiment where n equals 4, the number of degrees of phase delay between sets is $p = 0(360/4) = 0°$; $p = 1(360/4) = 90°$, $p = 2(360/4) = 180°$ and $p = 3(360/4) = 270°$. Assuming that switch A is switched at zero degrees phase, sets B, C and D are switched at 90, 180 and 270 degrees.

The waveforms at junctions 30 of sets A-D are shown in FIGS. 5A-5D, respectively. FIG. 5E represents the current waveform at common output terminal 13.

The advantages of the present invention will now be discussed in conjunction with these figures and some specific assumptions. It is assumed that the switchers are switched at $f_S = 60$ kHz and as shown in FIGS. 5A-5D the modulation is 62.5 percent, where the positive part of each cycle is positive over 62.5 percent of each cycle duration of 16.66 usec. It is also assumed that the desired current load is 40 A and that the ratio of ripple or switching current to the desired load current is 20 percent.

In the presently desired embodiment, since n switch sets are used, the current requirement through each set is only $40 A/n = 40 A/4 = 10$ A. Thus, the maximum ripple current fluctuates between $10 A + 2A = 12$ A and $10 A - 2 A = 8$ A, i.e., a peak-to-peal swing of $12 A - 8 A = 4$ A. This is unlike the prior art, where under the same assumptions, the peak to peak ripple current is 16 A.

In the present invention, the filter is replaced by a single inductor for each set of switchers and a single output capacitor Cout. The four inductors are designated in FIG. 4 by $L_A$-$L_D$. In an inductor, the current through it ramps up or down during the positive and negative portions respectively of a square wave shaped voltage. In FIGS. 5A-5D the dashed lines designated $I_A$, $I_B$, $I_C$, and $I_D$ represent the waveforms of the ripple currents through the four inductors above and below the average currents of 10 A, designed Iaverage through each set. Again, for the specific example, the peak to peak ripple current through each inductor is 4A at 60 kHz.

FIG. 5E represents the waveform of the current at the output terminal 13. Since the four inductors $L_A$-$L_D$ are connected in parallel, the currents through them add up at point 13. As to the load current it is $10 A \times 4 = 40$ A and is designated by Itotal in FIG. 5E. As to the ripple currents $I_A$-$I_D$, they also add up. However, because of the switching phase delay of the four sets of switchers, these separate ripple currents tend to cancel each other to a very great extent.

For the particular example of 62.5 percent modulation, one ends up with a peak to peak of total ripple current $I_T$ of only approximately one quarter of the ripple current through a single set, i.e., approximately only 1 A peak to peak versus 4 A through each switch set, and versus 16 A in a prior art single set converter. Furthermore, and most significantly, the frequency of the ripple current is four times the switch rate $f_S$. The frequency of the ripple current is designated as $f_C$. This is most significant and merits elaboration.

By connecting n switch sets in parallel, the frequency of the combined ripple current is equal to $f_C$, where $f_C = n \cdot f_S$. The frequency $f_C$ can be thought of as the apparent switch frequency, where $f_S$ is the actual switch frequency. Consequently, one can obtain a much wider band width, i.e., faster response time by a significant factor. Clearly, by making n any reasonable implementable number, e.g., ten or more, one can obtain as fast a response time as one wishes. Also, as is known, the lower the switch rate of present-day switchers, the higher is their current rating reliability and the lower is their cost. For example, at present, there are reliably and relatively inexpensive switchers with a current rating of 100 A at a switch rate of 10 kHz. With the present invention, one can use such switchers, connect n sets of them in parallel to obtain any desired apparent switching frequency $f_C$ where the actual switching frequency ($f_C$) is only 10 kHz. Assuming one wants n $f_C = 200$ kHz and used only 10 kHz switchers, since $100 = n \cdot 10$, $n = 20$. Thus, twenty sets of switchers would be needed. In such a case, the preferred phase delay between the twenty sets should be 0, 18°, 36°... 342°.

By using switchers which actually switch at lower frequencies, one obtains higher efficiency, since, as is known, the cross-over power dissipated in the switchers is directly related to their actual switch rate. As to the significant reduction of the peak to peak total ripple current $I_T$ it should be obvious that it simplifies the filtering problems. A much smaller filtering capacitor Cout can be used. For example, in one embodiment actually reduced to practice the output capacitor Cout was only 5.5 uF. For the same filtering of 60 dB, as herebefore recited, for a prior art single set converter, i.e., 60 dB at $f_S=60$ kHz, in the present invention it was achieved with $L_A=L_B=L_C=L_D=4.208$ uH=832 uH. The corner, instead of being at 600 Hz was at 4.8 kHz, i.e., a band width broadening by a factor of 8, and this was for the worst case in terms of percent modulation. It should, therefore, be obvious that the present invention provides immense advantages in terms of band width broadening and filtering simplification. In the prior art, with one set of switchers S1 and S2 (see FIG. 1) the current from each DC power source e.g. $+$Edc$=200$ V, is a sharp plse e.g. 40 A of the duration the switcher, e.g., S1 is On, at the switch frequency $f_S$. Due to these high pulses elaborate filtering at the input is required.

In the present invention, when the percent is such that at any time one of the S1 switchers (or S2 as the case may be) is On, all the time, the current flow from the DC is continuous rather than pulse shaped. Even if the percent modulation is such that none of the S1 switchers is On at any given time, the amplitude of the current pulse would be 10 A for n=4. Also the pulse frequency would be n times $f_S$. Thus, the input filtering requirement is greatly simplified.

It should be pointed out that as for the reduction in peak to peak ripple current, the example given is a worst case one. With four sets of 0°, 90°, 180° and 270° phase delay, the peak to peak of $I_T$ is worst at modulation percentages of 12.5, 37.5, 62.5 and 87.5. It is actually zero, i.e., $I_T=0$ at modulation percentages of 0, 25, 50, 75 and 100.

In the prior art, the peak to peak of the ripple current is greatest at 50 percent modulation. With the present invention the worst peak to peak ripple current case is much less than the best situation for the prior art one switch set case.

All of the above-described advantages of the present invention are obtained at the minimal price of increased complexity of the circuitry.

Figure 1:
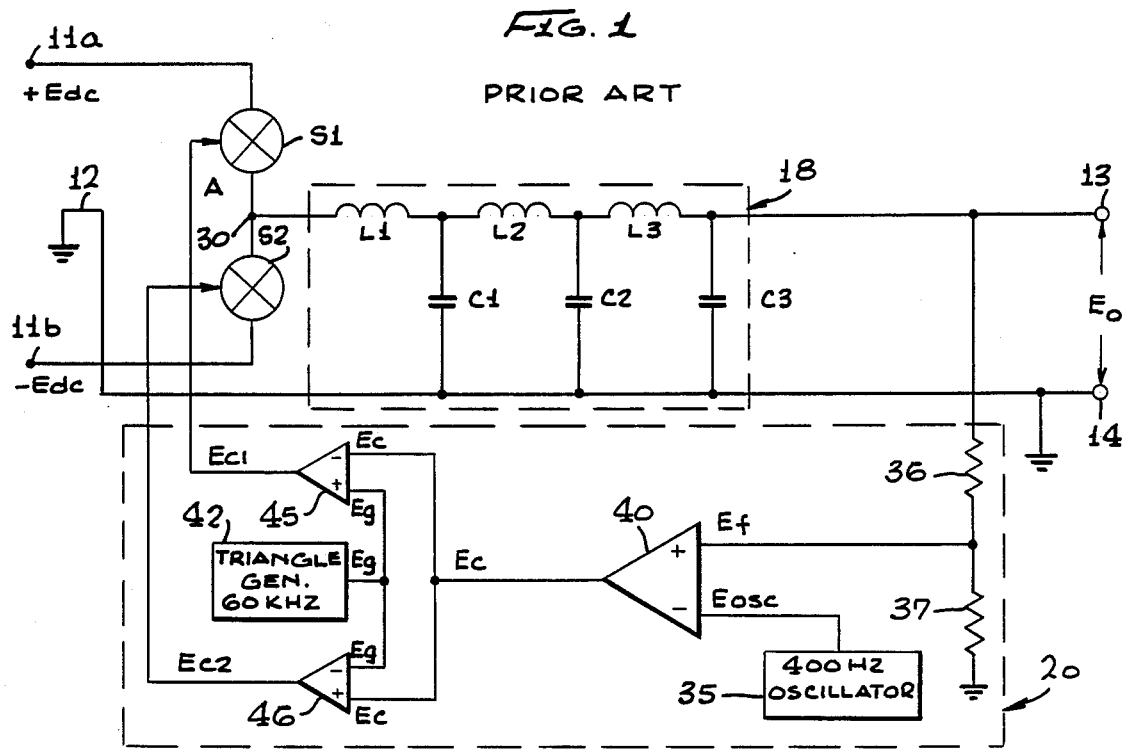
FIG. 1 corresponds to FIG. 3 in U.S. Pat. No. 4,067,057 and is used to summarize the prior art.
Figure 6:
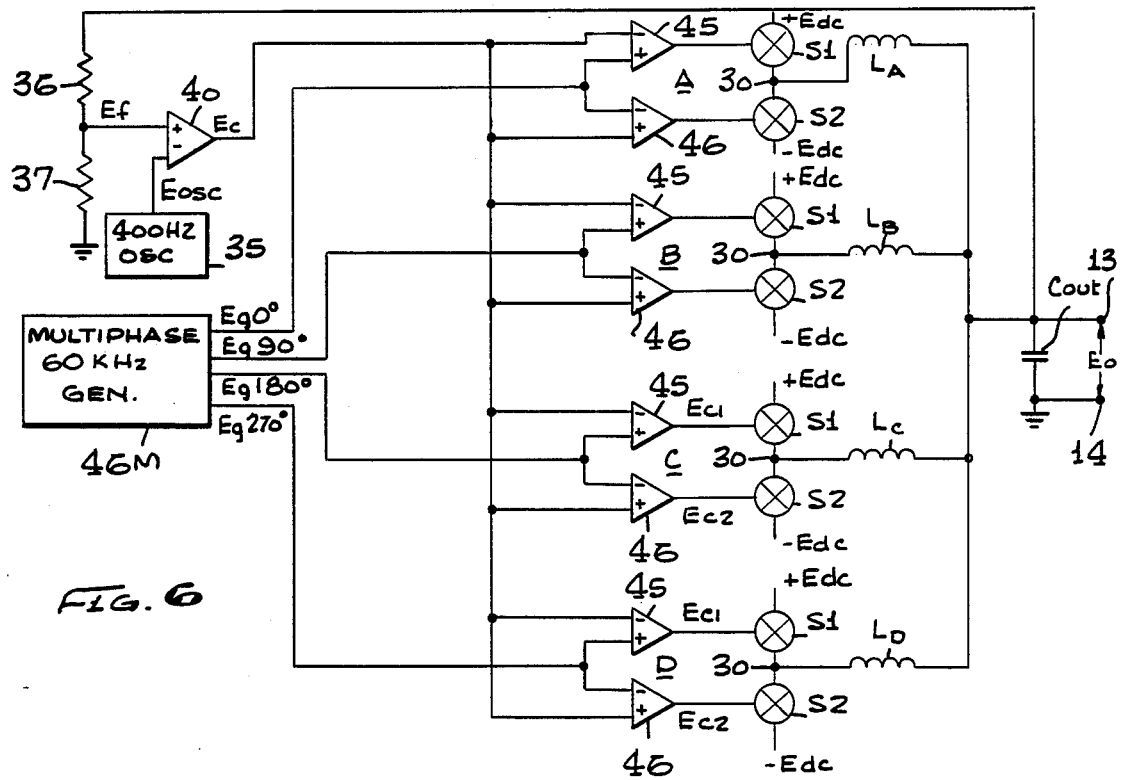

To switch the n sets of the switchers at phase delays of $p=m(360/n)$, where m=0, 1, ..., (n−1) one needs to employ a multiple phase generator, rather than the single phase generator 46 (see FIG. 1). Such a generator is shown in FIG. 6 and is designated by 46M. The manner of producing four separate triangular wave shapes at phase delays of 0°, 90°, 180° and 270° is clearly within the state of the art and can be implemented in many different ways. The rest of the circuitry, shown in FIG. 6, is simply to accommodate the four sets of switchers A–D and is similar to the arrangement shown in FIGS. 1 and 4. The switchers S1 and S2 of each sets are implementable with state of the art devices such as bipolar switching transistors. One implementation is shown in U.S. Pat. No. 4,067,057, in FIG. 6 thereof.

One can view the two switchers S1 and S2 of each set as an amplifier with an output impedance which for practical purposes can be regarded as zero. Since, in accordance with the present invention, the outputs at junctions 30 of the four sets of switchers are connected in parallel, in essence the outputs of several zero output impedance amplifiers are connected together. Such a connection may create a very serious problem unless the problem is carefully addressed.

If for any reason a slight output imbalance were present between the voltages at the various junctions 30, and since the output impedance of each switcher set is zero, even the smallest voltage difference may cause current to flow into one or more of these switcher sets. For example, assume that under ideal conditions the average voltage at each junction is to be 100 V. Then further assume that the voltages at the junctions of sets A, C and D are 100 V each and that at junction 30 of set B is 101 V.

Since the output impedance of each of these sets if assumed to be zero, large currents may flow into set B. These currents may be DC currents as well as AC currents at low frequencies at which the impedance of $L_B$ can be regarded as practically zero. Higher frequency currents will be greatly reduced by the higher impedance of $L_B$ at such higher frequencies. For explanatory purposes and in the appended claims, DC currents and low frequency currents for which the impedance of $L_B$ is very low will be referred to generically as substantially 'DC' currents. Such substantially 'DC' currents, which may be extremely high, must be prevented from flowing between the switcher sets. This is necessary to prevent loss and, more important, to prevent possible malfunctioning of the switchers since the currents that may flow into them may be so high as to cause a total breakdown. Also, it is important that these currents flowing into the switchers be eliminated and that the output voltages of the switchers be as close to equal as possible in order to ensure that each set of swtichers supplies an equal amount of power to the load.

One straightforward solution, though far from ideal, is to place a small resistor in series with the inductor at the output of each set. The resistor will make the output impedance of the set be other than zero. For example, a 1 ohm resistor in each output may do the trick, by reducing the 'DC' current to a manageable value. For example, with a 1V voltage difference and a 1 ohm resistor, the 'DC' current would be about 1 A. Such a solution may prevent damage to the switchers, but would be inefficient since the $I_2R$ losses would occur in each resistor and thus cause substantial reduction in efficiency.

One aspect of the present invention provides a specific solution to the embodiment shown in FIG. 6 as well as a generic solution to parallely connect driver amplifiers, generally referred to as networks, whose outputs are connected together and which are characterized by zero output impedance, in order to prevent 'DC' current flow between them due to output voltage imbalances. The solution offered by this aspect of the invention is defined as a lossless 'DC' current flow prevention between networks with zero output impedances.

Figure 7:
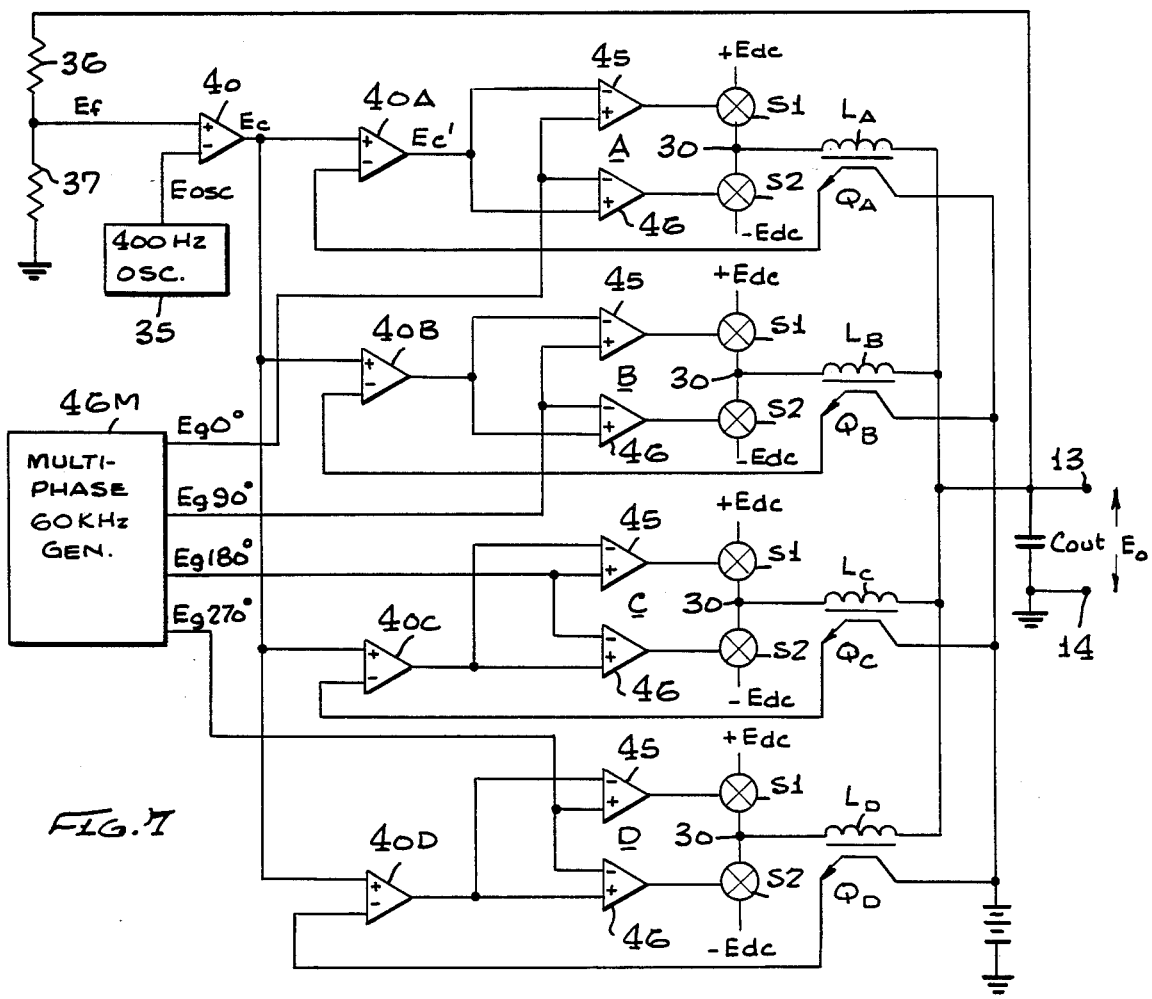
FIG. 7 is a simplified diagram useful in explaining another aspect of the invention.

Attention is first directed to FIG. 7 which is very similar to FIG. 6, with like elements being designated by like numerals. In FIG. 7 each set or a pair of switches such as set A has two elements added in addition to those shown in FIG. 6. These two elements are a 'DC' current sensor device which is coupled to the set's inductor. To sense the 'DC' current which flows through the inductor, this element may be a Hall Effect device or transistor Q, such as $Q_A$. The other element is an amplifier 40 followed by the sets designation; example 40 A associated with set A. The latter provides an output Ec' which is a function of the error signal Ec from amplifier 40 and the 'DC' current through $Q_A$. The two additional elements for each of the other sets B-D are designated by corresponding suffix letters.

It should be obvious that the average voltage at each junction 30 is a function of the modulation percentage. It is higher as the present modulation increases. The present modulation is a function of Ec from amplifier 40 and the signal Eg from generator 46M. In the present invention, if the voltage at junction 30 of any set, e.g., A, is higher than at junction 30 of the other sets, resulting in a 'DC' current flowing into junction 30, the 'DC' current sensed by $Q_A$ effectively is summed up with the error signal Ec to produce Ec', which reduces the percent modulation of the set A until the current flow into junction 30 of the set A is zero.

It should thus be appreciated that in the present invention the DC output currents of all sets are sensed by $Q_A$-$Q_D$ and used to modify the percent modulations of the separate sets of switchers so that any 'DC' currents which may flow between them are reduced to zero. The prevention of 'DC' current flow between the sets effectively appears as if the output impedances of these sets were made to be high, an effect achieved without resistors or other energy wasting devices.

Thus, a lossless 'DC' current flow prevention is achieved for parallely connected zero output impedance switchers or devices. It should be stressed that in the present invention since the average voltages of the various sets (four in FIG. 4 and 6) at junction 30s are forced to be equal—this by varying the percent modulation of each set—the four sets share equally in the supply of power to the load across output terminals 13 and 14. Such equal sharing is highly desirable for the safe operation of the converter, by extending the life of the switchers S1 and S1.

The lossless technique for effectively increasing the output impedances of parallely connected zero impedance amplifiers is not limited to switchers in a switching converter, such as herebefore described. The technique is applicable whenever zero impedance amplifiers or networks are connected in parallel.

Figure 8:
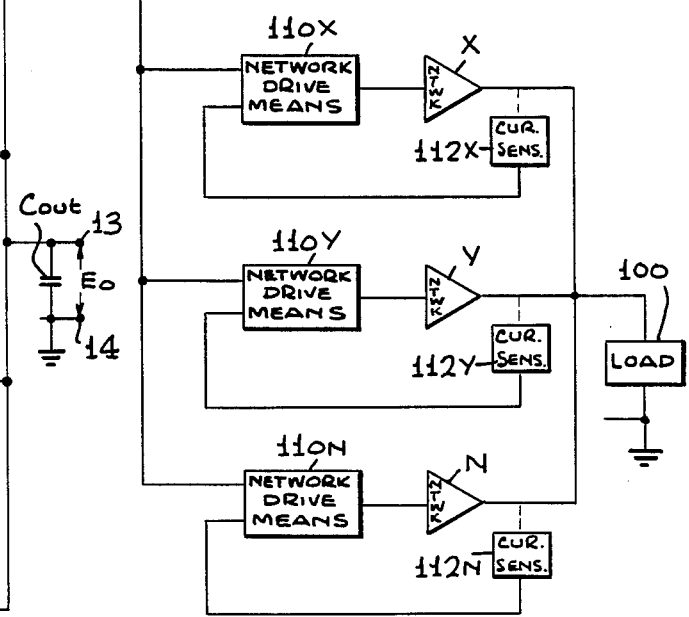
FIG. 8 is as simplified diagram for explaining a lossless technique for preventing current flow between zero impedance amplifiers.

The generic technique can be summarized in conjunction with FIG. 8 to which reference is now made. Therein N separate networks X, Y . . . N are shown with the zero impedance outputs connected in parallel to a load 100. The networks are assumed to be driven by their individual network drive mans 110X, 110Y . . . 100N. These are in turn driven by a main drive circuit 120. In accordance with this aspect of the invention, a separate DC current sensor is coupled to the output line of each network to sense the flow of current therein. These current sensors are designated by 112X, 112Y . . . 112N. The output of each current sensor, e.g., 112X is fed to the network's drive means, e.g., 110X to control the latter (by providing the DC current as a negative feedback signal) to modify the driving of the network so that the voltages at the output of all networks are the same. Thus, the flow of currents between them is inhibited. Alternately stated, the 'DC' current is sensed and fed back to the network's drive means to control the network so that it appears to have a high output impedance—a property obtained by lossless means; that is, without energy-consuming resistors or the like.

Although particular embodiments of the invention have been described and illustrated herein, it is recognized that modifications and variations may readily occur to those skilled in the art and consequently it is intended that the claims be interpreted to cover such modifications and equivalents. For example, for the operation of the embodiment shown in FIGS. 4 and 6 and described in connection with FIGS. 5A-5E, it is important that due to the square wave shaped voltage at junction 30 of each set, the current ramps up or down during the positive and negative portions of each cycle. This is achieved by placing an inductor in the current path. Four such inductors $L_A$-$L_D$ are shown. However, the positive and negative ramping currents may be achieved by a synthesized network means which may be other than an inductor. Thus, the invention is intended to cover such means.

The embodiments of the invention in which an exclusive property or privilege is claimed are defined as follows:

1. A switching type DC to AC power converter comprising:

a source of DC power;

output means to which a load, to which AC power is to be supplied, is connectible;

n separate sets of switch means, each set comprising a pair of switchers having a common junction, n being an integer not less than 2;

control means including modulation means coupled to the pairs of switchers of said n sets for controlling the switchers of each set to switch between On and Off states, whereby a substantially square wave shaped signal at a switch frequency definable as $f_s$ at a controlled percent modulation appears at the set's common junction and further controlling said switchers so that the n square wave shaped signals are at a synchronous preselected phase delay with respect to one another;

filter means connected to said n junctions and to said output means for filtering switching energy at said n junctions at said frequency $f_s$; and means for sensing the currents flowing to and from said n junctions and for affecting said modulation means to control the percentages of modulations of the square wave shaped signals from said n sets to minimize the flow of currents between said n sets, independent of the average current flowing to said output means from said n sets.

2. A DC to AC power converter as recited in claim 1 wherein said means for sensing the currents comprise a separate current sensor for each set, said sensors sensing any substantially 'DC' currents flowing between said sets, n sensors being coupled to said control means for controlling the percentages of modulations of said square wave shaped signals so that the flow of any substantially 'DC' currents between said sets is substantially zero.

3. A DC to AC power converter as recited in claim 2 wherein said filter means include n means, each separately connected between the junction of the set of switch means with which it is associated and said output means, each of said n means being of the type whereby switch energy at $f_S$ passing therethrough and definable as ripple current, ramps up and down during the positive and negative portions of each cycle of the square wave shaped signal, said n means being connected to said output means, whereby the ripple current thereat after passing through said end means is at the frequency $f_C$ where $f_C > f_S$.

4. A DC to AC power converter as recited in claim 3 wherein each of said n means is an inductor.

5. A DC to AC power converter as recited in claim 3 wherein said modulation means include means to control the delays between said n signals.

6. A DC to AC power converter as recited in claim 5 wherein said phase delays between the n signals at the n junctions are definable in degrees as p, where $p = m \cdot (360/n)$, where $m = 0, 1, \ldots, (n-1)$.

7. A DC to AC power converter as recited in claim 6 wherein each of said n means is an inductor.

8. In a circuit arrangement comprising a plurality of network means, each characterized by zero output impedance and network means having their outputs connected in parallel to a load and being driven by drive means, the improvement comprising:
   current sensing means for sensing the currents flowing between any of said plurality of network means and coupled to said drive means for controlling the latter to modify the driving of said network means so as to substantially eliminate the flow of currents therebetween, independent of the average current flowing from said network means to said load.

9. The circuit arrangement as recited in claim 8 wherein said current sensing means comprise a plurality of current sensing devices, each associated with the output of another one of said network means for sensing the direction and magnitude of current flow from and to the network means.

10. The circuit arrangement as recited in claim 9 wherein said drive means includes a plurality of network drivers, each associated with another of said network means and means for connecting the current sensing device associated with each of said network means to the networks driver to drive the latter so as to prevent current flow to and from it to another of said networks.

11. The circuit arrangement as recited in claim 10 wherein said drive means drives its associated network means to produce a square wave at a percent modulation controlled by the drive means of said network means, and wherein the currents sensing means controls said drive means to vary the percent modulation of the square waves produced by said network means so that the average voltages at their outputs are substantially identical.

* * * * *